United States Patent [19]

Le Jaoudour

[11] Patent Number: 5,150,131
[45] Date of Patent: Sep. 22, 1992

[54] GRAPHICS PRINTER INCLUDING DEVICE FOR MAINTAINING PRINT MEDIUM CONTACT

[75] Inventor: Thierry Le Jaoudour, Creteil, France

[73] Assignee: OCE Graphics France, S.A., Creteil Cedex, France

[21] Appl. No.: 643,944

[22] Filed: Jan. 22, 1991

[30] Foreign Application Priority Data

Jan. 22, 1990 [FR] France ............................... 90 00704

[51] Int. Cl.$^5$ .......................... G01D 15/28; B65H 5/02
[52] U.S. Cl. .................................... 346/134; 346/136; 346/138; 271/276
[58] Field of Search ........................ 346/134, 136, 138; 271/276

[56] References Cited

U.S. PATENT DOCUMENTS 4,734,716 3/1988 Silverberg et al. ................. 346/136

FOREIGN PATENT DOCUMENTS 2943894 9/1980 Fed. Rep. of Germany .
57-196110 12/1982 Japan .

Primary Examiner—Benjamin R. Fuller
Assistant Examiner—Gerald E. Preston
Attorney, Agent, or Firm—Birch, Stewart, Kolasch & Birch

[57] ABSTRACT

A graphics printer including a device for ensuring contact between a print medium and a guiding platform at the printing zone of the graphics printer, including a suction chamber, a suction means for creating a partial vacuum in the suction chamber located beneath the guiding platform and a plurality of orifices formed across the width of the platform communicating with the suction chamber, the print medium being guided over the platform covering a variable portion of the width of the platform as a function of the format of the print medium, the suction chamber being provided with one or more partitions separating the chamber widthwise into compartments while leaving a limited air passage section between the adjacent compartments.

16 Claims, 5 Drawing Sheets

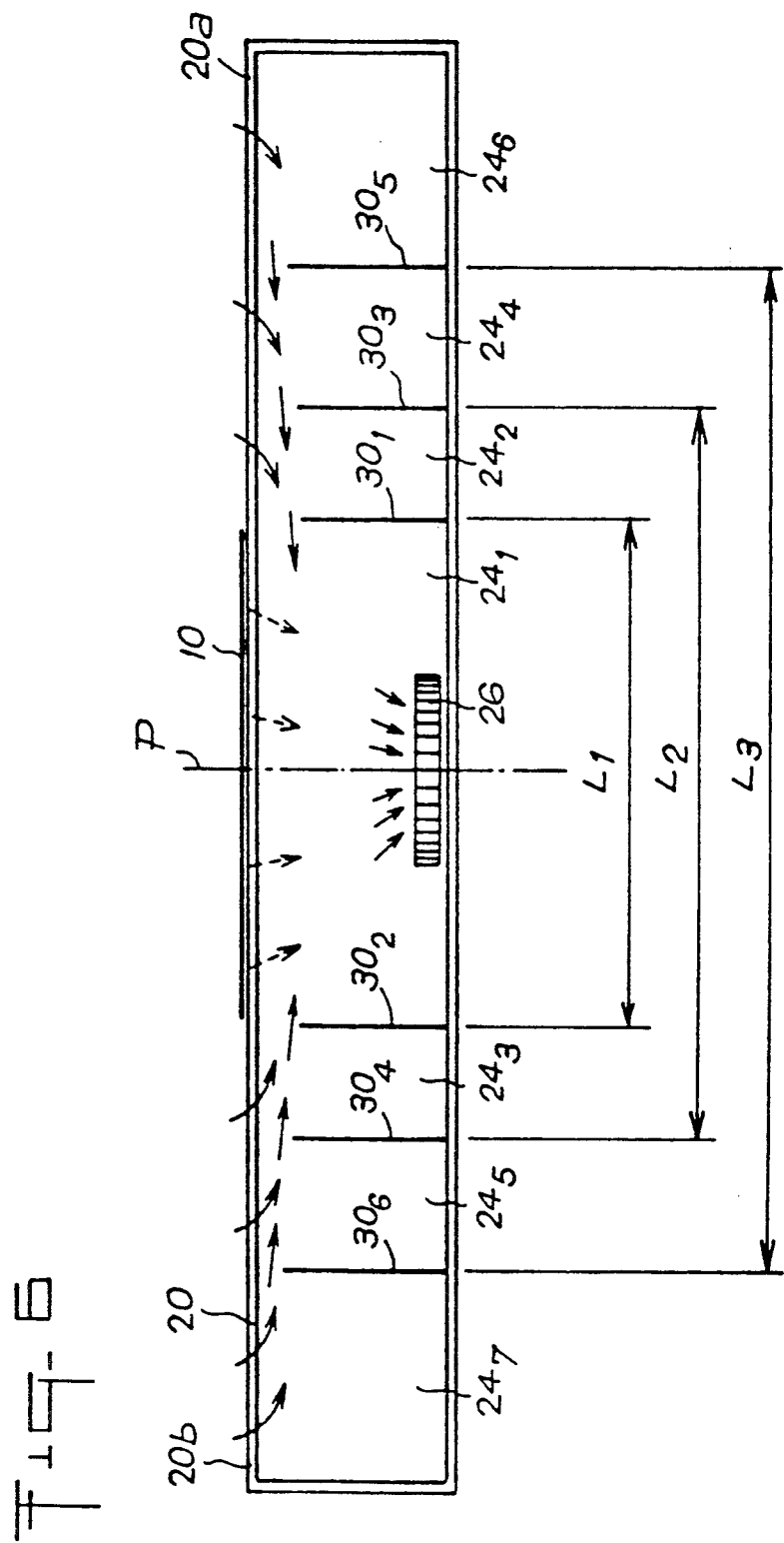

GRAPHICS PRINTER INCLUDING DEVICE FOR MAINTAINING PRINT MEDIUM CONTACT

BACKGROUND OF THE INVENTION

1. Field of the Invention

The present invention relates to a graphics printer, such as a vector mode graphics printer (pen plotter) in which a drawing is produced by relative movement between a print medium and a writing head and more specifically to a device for ensuring contact between the print medium and guiding platform in the printing zone of the graphics printer.

2. Discussion of Related Art

In a pen plotter, such as shown in FIG. 1, a drawing is produced by a combination of to-and-fro movements of the print medium 10 in a first direction (X), and of a writing head 12 in a second direction (Y), perpendicular to the first direction. In the active zone of the writing head, the print medium 10 passes over a platform 20 that may be extended at the front and/or the rear by a skirting. The displacement of the print medium in the X direction is e.g. provided by a drum having an upper generatrix at the level of the surface of the platform and upon which the print medium is applied by means of pressure rollers. The displacement of the writing head 12 is effected, in the Y direction, above and parallel to the platform. At the level of the active zone of the writing head 12 the platform 20 comprises a plurality of orifices 22 which communicate with a suction chamber 30 located beneath the platform so as to create a partial vacuum beneath the print medium. The purpose of this partial vacuum is to prevent the print medium from being lifted above the platform at the level of the writing zone under the effect of the movement imparted to the medium.

However, there are certain conditions in which the print medium 10 is not held in contact with the platform 20 with the required degree of efficiency. Depending on its format, the print medium may occupy more or less a large portion of the width of the platform and accordingly will cover either all or some of the orifices 22 of the platform. In general, the print medium is introduced on to the platform with a first edge 10a placed at one end 20a of the platform, respective of the print medium format. Consequently, the second edge 10b of the print medium is at a greater or lesser distance from the other end 20b of the platform, leaving a larger or smaller number of orifices 22 uncovered, depending on the width, i.e. the format, of the print medium. Because of leakages through the uncovered orifices, the partial vacuum generated beneath the print medium may be insufficient to ensure a good contact between the print medium and the platform, particularly in the case of small formats. Consequently, occasional rising or lifting of the print medium may occur, especially at the site of the edge 10b, which brings about a number of disadvantages.

For example, there can result untimely contact between the print medium and the writing head while the writing tool carried by the latter is in a raised position. This leads to parasitical lines appearing on the drawing which, of course, is highly undesirable. Moreover, it has been observed that the corner of the print medium, at its free end and at edge 10b, can rise off the platform and come into contact with different parts of the printer and, in particular, into contact with the casing of a cutting device 18 carried by the writing head 12 and intended for cutting the format when the printer is operating in continuous print medium mode. Rubbing of the printed face of the print medium over a part of the printer can smear the drawing which is generally not dry at this stage. Furthermore, if the free end of the print medium comes to block itself against a part of the printer, jamming (accumulation of the print medium) could result which could possibly stop the operation of the printer In order to ensure the best possible contact of the print medium against the platform, it has been envisaged to increase the power or the number of suction devices used to generate the required partial vacuum in the suction chamber. However, this would result in an increase in the possibility of obstruction, cost and energy consumption, as well as in an increased level of noise.

SUMMARY OF THE INVENTION

Therefore, it is an object of the present invention to provide a graphics printer having the capability for maintaining proper contact of the print medium regardless of the format with the guiding platform of the printer which will overcome the above noted disadvantages.

Another object of the present invention is to provide a graphics printer which will reliably maintain the print medium in continuous contact with the guide platform thereof.

A further object of the present invention to provide a device capable of ensuring effective contact of the print medium, irrespective of the format, with a guiding platform without requiring additional suction means, thus allowing for the use of a large number of formats.

Still a further object of the present invention is to provide a simple device by means of which any leakage effect through the orifices of the guiding platform are minimized when using small formats.

The foregoing objects and others are accomplished in accordance with the present invention, generally speaking, by providing a printer having a suction chamber provided with one or more partitions separating the suction chamber width-wise into compartments while leaving a limited passage section between adjacent compartments. The one or first of the compartments extends beneath that portion of the platform which comprises at least a fraction of the width of the platform occupied by a print medium having the smallest possible format amongst the formats capable of being accommodated by the printer. Thus, in the case of a small format, the partitioning of the suction chamber makes it possible to limit the leakage effect through the orifices of the platform not covered by the print medium. It is thus possible to maintain a partial vacuum across substantially the entire width of the print medium sufficient for pressing or attracting the latter completely against the platform The suction chamber may be equipped with a number of partitions placed in the chamber at locations substantially corresponding to zones of the platform occupied by longitudinal edges of the print media reflected by the different formats accommodated by the printer. In order to obtain a suction in a respective chamber sufficient to ensure satisfactory contact of the print medium with the guiding platform, for large formats as well as for small formats, one or a number of suction devices are provided, such that at least one suction device acts within the first compartment.

The first compartment, which is located under that portion of the platform that comprises the fraction of the platform width which would necessarily be occupied by the print medium having the smallest format, is positioned at one end of the suction chamber or at its center, depending on whether the print media are brought over the platen with a longitudinal edge located at an end of the platen, or whether the print media are centered on the platen.

The graphics printer or plotter operating in accordance with the present invention can operate either continuously or sheet-by-sheet so that in the continuous mode, the plotter is fed by a print medium drawn from a supply roller, and in the sheet-by-sheet mode the plotter is fed by precut sheets.

BRIEF DESCRIPTION OF THE DRAWINGS

The invention shall be more clearly understood for the following non-limiting description of the preferred embodiments with reference to the appended drawings in which:

FIG. 6 is a highly schematic representation of an alternative embodiment of a device according to the invention.

DESCRIPTION OF THE PREFERRED EMBODIMENT

Figure 1:
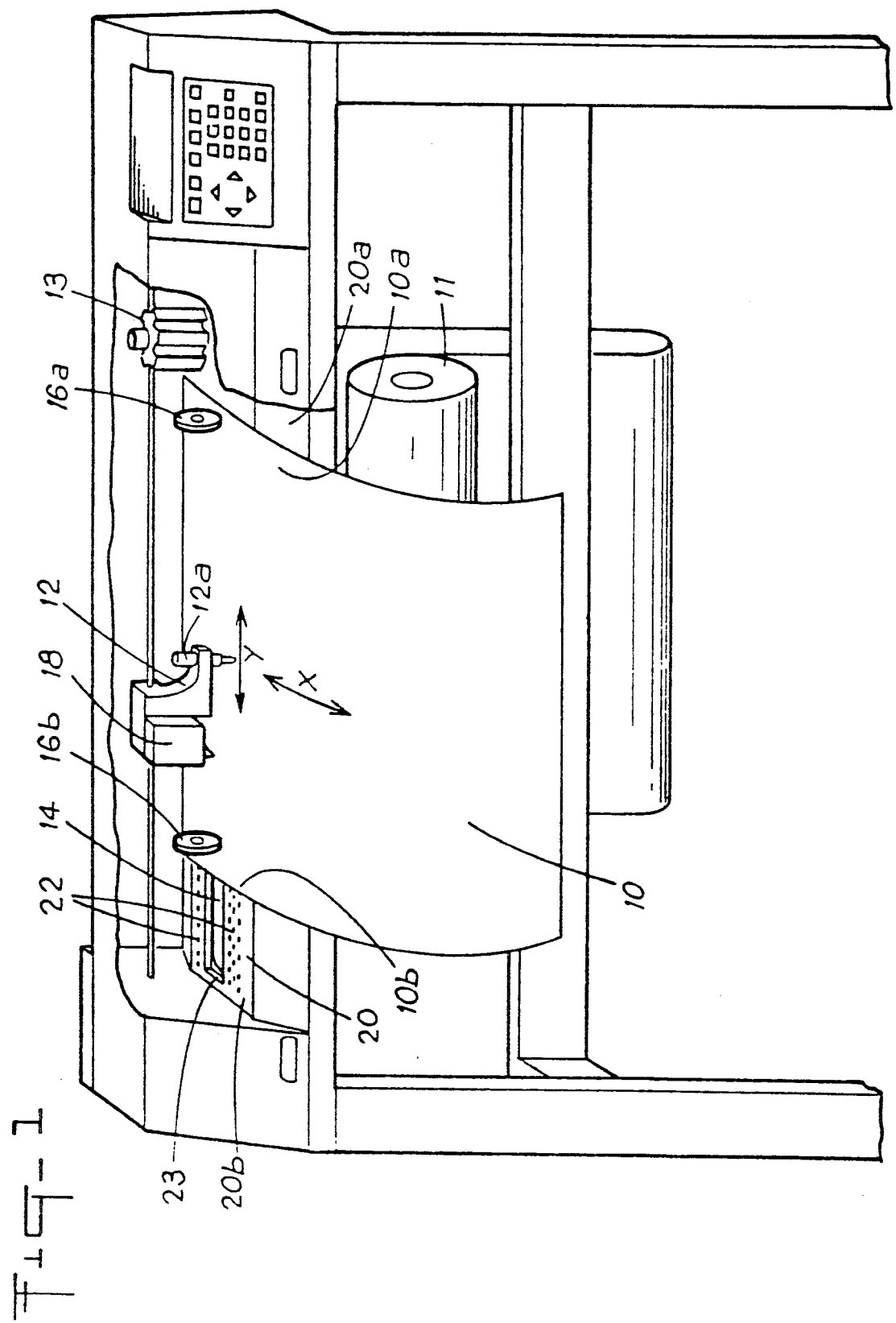
FIG. 1 is a schematic general view of a pen plotter.

An embodiment of the present invention is described hereinafter in the context of a pen plotter of the type illustrated in FIG. 1, which uses a continuous print medium Reference shall initially be made to FIGS. 1 to 3.

The pen plotter comprises a platform 20 over which is guided the print medium 10 which is drawn from a supply reel 11. As already stated, the print medium 10 is displaced in the X direction (longitudinal direction of the print medium) by means of a drum 14 having a horizontal axis perpendicular to the X direction. The print medium is pressured against drum 14, in the region of its edge portions 10a, 10b, by means of pressure rollers 16a, 16b which act through a transversal slot 23 formed across the platform 20. The upper generatrix of drum 14 lies substantially at the level of platform 20, through slot 23. The print medium 10 has a longitudinal edge 10a located close to the end 20a of the platform, irrespective of its format. The pressure roller 16a acting at the edge 10a has a fixed position in the Y direction. The other longitudinal edge 10b of the print medium is more or less remote from end 20a, Consequently, the pressure roller 16b is adjustable in the Y direction, in order to be brought to the edge 10b.

The writing head 12 is movable in the Y direction along a writing line 21 (FIG. 2) situated at the surface of the platform 20, slightly in front of the slot 23. The writing line 21 is represented as a groove formed in the upper surface of the platform 20 over a part of the thickness thereof. The writing head 12 bears a writing tool 12a. Several writing tools may be stocked in a turret 13 at the end 20a of the platform, allowing an automatic changeover of the writing tool.

Figure 2:
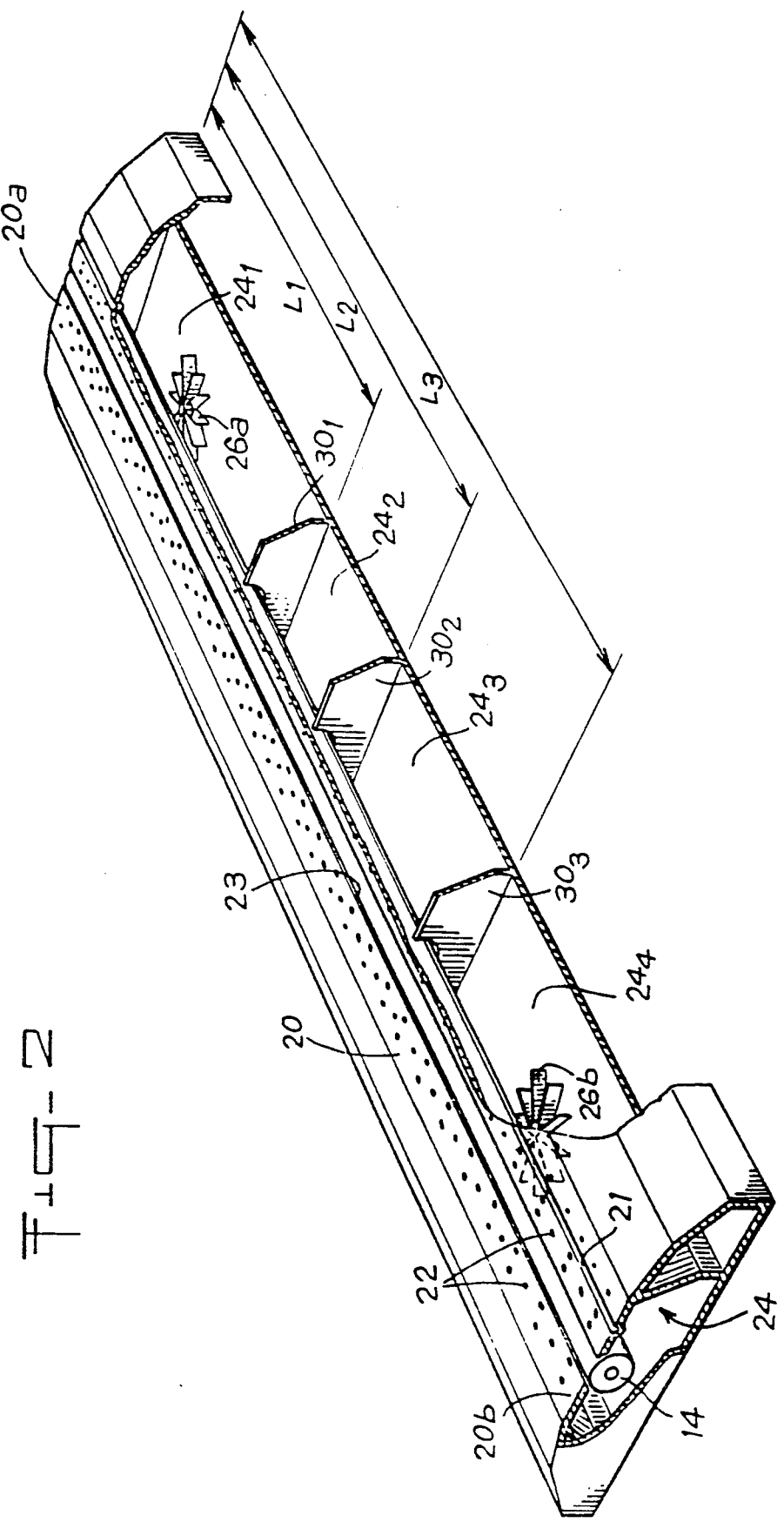
FIG. 2 is a partial view showing a suction chamber partitioned in accordance with the present invention.
Figure 3:
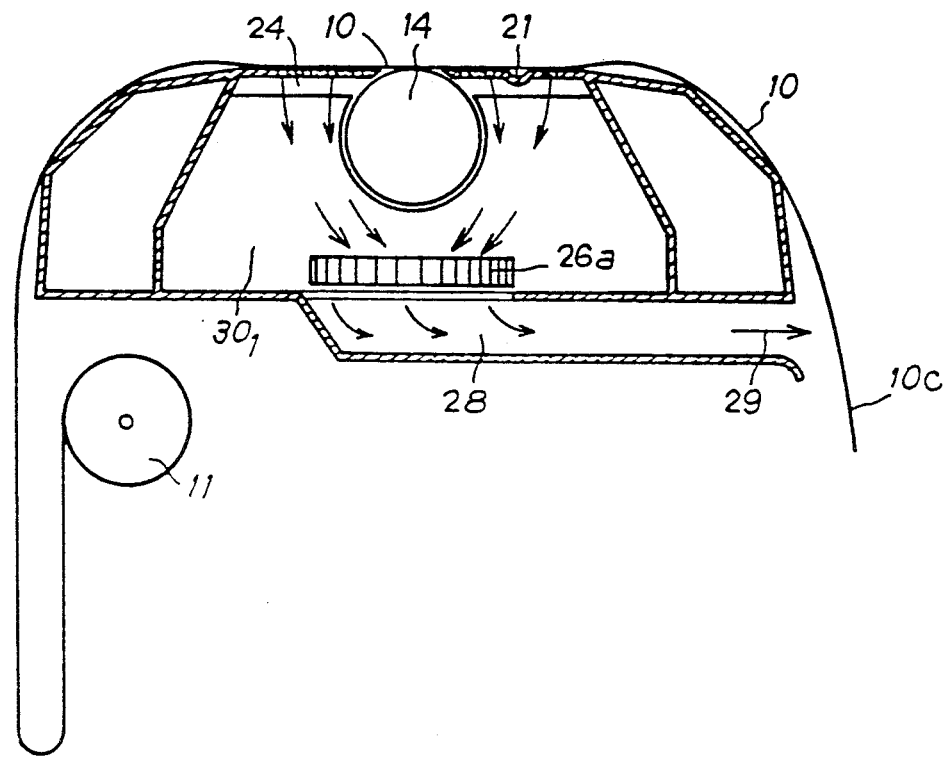
FIG. 3 is a lateral sectional view of the chamber shown in FIG. 2, FIGS. 4A to 4D are diagrams illustrating the operation of the device according to the invention shown in FIG. 2.

As shown in more detail in FIGS. 2 and 3, the suction chamber 24 is comprised of a box section having an upper wall formed by the platform 20. The latter is provided with orifices 22 along its entire width. The orifices are arranged in a number of rows situated in the vicinity of the writing zone and slot 23. More specifically, FIG. 2 shows rows of orifices situated behind the slot 23, between the slot 23 and the writing line 21, and in front of the writing line. Other orifices may be formed at the bottom of the groove defining the writing line.

The partial vacuum inside the chamber 24 is created by means of fans 26a, 26b. The air expulsed by the fans is directed to a conduit 28 (FIG. 3) which is located beneath the suction chamber and discharges at the front of the printer, at a level where the print medium 10 leaves the platform 20 and is no longer supported. The conduit 28 extends practically throughout the width of platform 20. Accordingly, the air flux 29 drawn out by conduit 28 produces a secondary guiding of the print medium by acting on the lead end portion 10c of the print medium that hangs at the front of the printer, to prevent it from coming into contact with elements of the printer or objects supported by the printer. Such a secondary guiding system is the subject of U.S. patent application Ser. No. 631,414 filed on Dec. 21, 1990 by the Applicant.

To ensure a sufficient air flux 29 even when all or substantially all of the orifices 22 are covered by a print medium of maximum format, a supplementary air inlet is provided in the suction chamber 24 This air inlet is constituted e.g. by an opening 27 (FIGS. 4A to 4D) situated in the lateral wall of chamber 24 at the end 20b of the platform 20.

According to the present invention, the suction chamber 24 is partitioned along its width, as seen in FIG. 2. By way of example, considering a plotter that uses print media adapted to produce drawings ranging in formats from A4 (210 × 297 mm) to A0 (841 × 1189 mm), preferably a number of partitions are arranged inside of the chamber 24, and specifically at locations corresponding to various zones of the platform, situated at distances from the end 20a of the platform, that are substantially equal to the widths of the print media used. Thus, a first partition $30_1$ is situated at a location corresponding to a zone of the platform situated at a distance from the end 20a substantially equal to the width ($L_1$) of the print medium used for printing an A4 format ($L_1 = 297$ mm). Likewise, a second partition $30_2$ is situated at a location that corresponds to a zone of the platform situated at a distance from the end 20a substantially equal to the width ($L_2$) of the print medium used for printing an A3 format ($L_2 = 420$ mm). Finally, a third partition $30_3$ is situated at a location corresponding to a zone of the platform situated at a distance from the end 20a substantially equal to the width ($L_3$) of the print medium used for printing an A2 format ($L_3 = 594$ mm). The partitions $30_1$, $30_2$, $30_3$ are formed by vertical plates that extend in the X direction and separate the chamber 24 into compartments $24_1$, $24_2$, $24_3$ and $24_4$.

Each partition does not completely isolate one from the other two adjacent compartments that it delimits, but leaves a limited passage section therebetween. As shown in FIG. 3, this passage section can be in the form of a clearance between the upper edge of the partition and the inner face of the platform. FIG. 3 also shows a cutting formed in the upper edge of the partition to allow for the passage of the drive drum 14.

Figure 4A:
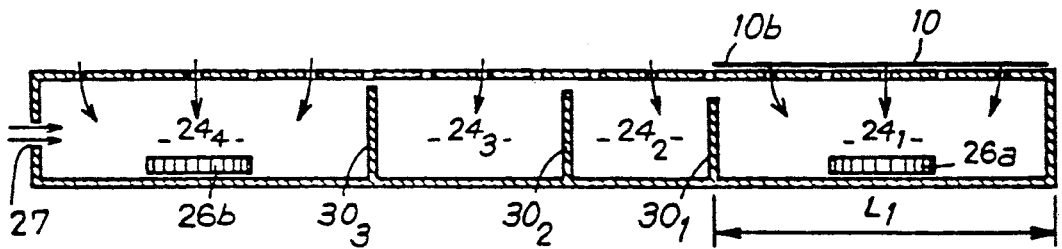

The purpose of the partitions $30_1$, $30_2$, $30_3$ shall be described hereafter with reference to FIGS. 4A to 4D. When the print medium used has a minimum width, it extends on the platform between the edge 20a and the level of partition $30_1$, covering the orifices 22 that communicate with compartment $24_1$ (FIG. 4A). Due to the provision of partition $30_1$, the effect of the air leakage through the orifices 22 not covered by the print medium and through opening 27 is minimized, because the partition $30_1$ leaves a limited passage section between compartment $24_1$ and the remainder of the suction chamber.

The fans 26a and 26b are located inside compartments $24_1$ and $24_2$ at the ends of chamber 24. In the example illustrated by FIG. 4A, the fan 26a produces the partial vacuum necessary to maintain the print medium on the platform, while fan 26b serves essentially to provide air flux 29. For a given power of fans 26a and 26b, the passage section between compartments $24_1$ and $24_2$ is determined in order that the edge 10b of the print medium remains pressed against the platform. It has been observed that a partial vacuum of approximately 4 to 4.5 mm $H_2O$ (i.e. 40 to 45 Pa) at the level of edge 10b of the print medium is sufficient. The passage section is therefore selected to ensure the required level of partial vacuum.

Figure 4B:
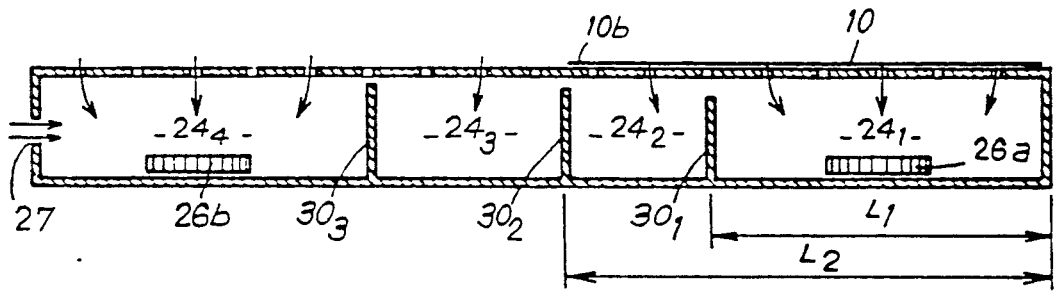

When the print medium used corresponds to an A3 format drawing, it extends on the platform between edge 20a and the level of partition $30_2$, covering the orifices 22 that communicate with compartments $24_1$ and $24_2$ (FIG. 4B). Partition $30_2$ leaves a limited passage section between compartments $24_2$ and $24_3$ to ensure the required partial vacuum at the level of edge 10b of the print medium. The contact of the print medium on the platform is ensured by fan 26a located inside compartment $24_1$. Since the partition $30_1$ creates a drop of load, the passage section at the level of partition 30, may become smaller than the one existing at the level of partition 30 to ensure the required partial vacuum at the level of partition $30_2$.

Figure 4C:
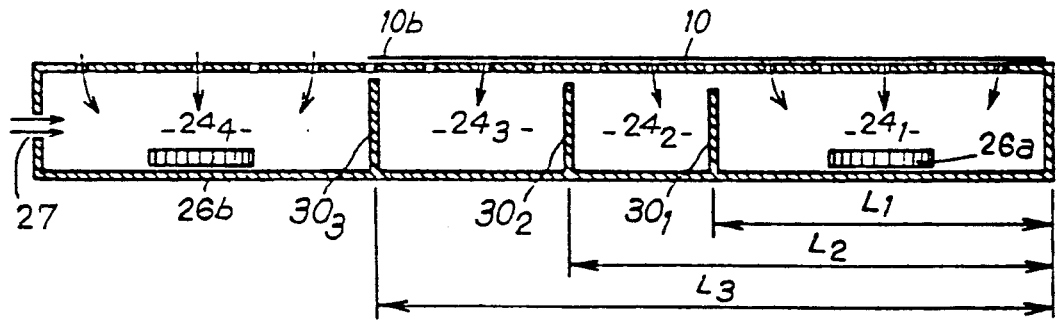

Likewise, when the print medium corresponds to an A2 format drawing, it extends on the platform between edge 20a and the level of partition $30_3$, covering the orifices 22 that communicate with compartments $24_1$, $24_2$ and $24_3$ (FIG. 4C). The passage section between compartments $24_3$ and $24_4$ is set so as to ensure the required partial vacuum at the level of edge 10b of the print medium The passage section may become smaller than those left by the partitions $30_1$ and $30_2$ by virtue of the load losses created by the latter.

Figure 4D:
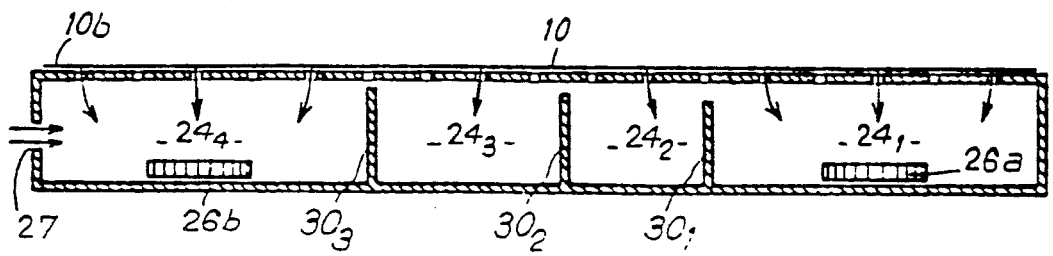

When the print medium corresponds to a drawing having an A1 or A0 format, it extends on the platform covering the orifices that communicate with compartments $24_1$, $24_2$, $24_3$, as well as a part of or all of the orifices that communicate with compartment $24_4$. The partial vacuum at edge 10b of the print medium is produced by fans 26a and 26b (FIG. 4D).

Figure 5:
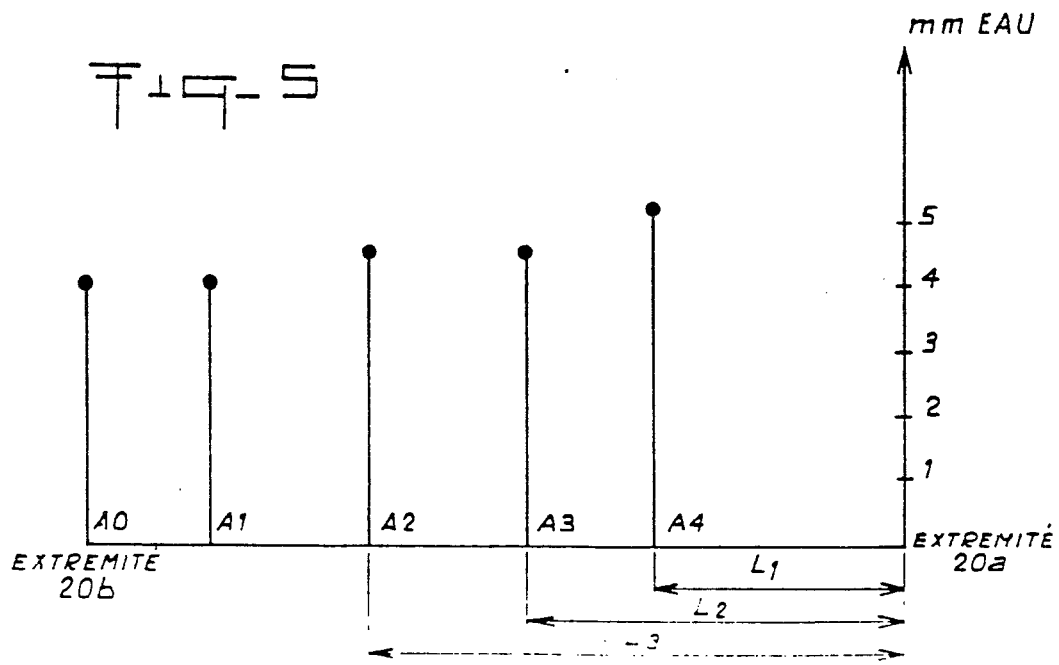
FIG. 5 illustrates the partial vacuums measured at the sheet edge for different formats with the suction chamber shown in FIG. 2.

Tests have been conducted with a graphics printer equipped with a suction chamber having three partitions arranged, as described above. The platform shows 329 circular suction orifices 22, having a diameter of 4 mm. The partitions were identical, leaving the same passage sections, each equal to 300 mm$^2$, between adjacent compartments. FIG. 5 shows the partial vacuums measured at the level of edge 20b for different widths of the print medium. Here the fans 26a, 26b used were identical and produced a static pressure of 70 Pa and a flow rate of 47 l/s at a zero pressure drop. As can be seen from FIG. 5, for all formats, an effective contact of the print medium against the platform is ensured since the partial vacuum beneath edge 20b is always at least equal to 4 mm $H_2O$ (40 Pa).

In the foregoing embodiment, the partitions were placed at distances from the edge 20a of the platform corresponding more or less exactly to the widths of the print media. A positioning tolerance is nevertheless possible, so long as the distance at which a partition is situated is greater than the corresponding width of the print medium, if it is not exactly equal to the latter. Furthermore, it may not be necessary to provide three partitions. In particular, acceptable results have been achieved by leaving out partition $30_1$, corresponding to an A4 format, and determining the passage section left by partition $30_2$ so as to obtain the required partial vacuum for the A4 format. More generally, the number of partitions can vary as a function of the number of different formats that can be accommodated by the printer.

The foregoing concerns cases where the print medium, irrespective of its format, is always placed on the platform with the edge 10a situated at the end 20a of the platform It is also possible to introduce the print medium centered on the platform, symmetrically with respect to a central plane of the platform parallel to the X direction. In this case, the partitions for the suction chamber 24 need to be arranged, as shown in FIG. 6, symmetrically with respect to the above mentioned central plane P. Two partitions $30_1$, $30_2$ that are mutually symmetrical with respect to the plane P, to delimit a central compartment 24 which extends over a part of platform 20, substantially corresponding to the fraction of the width of the platform occupied by the print medium used for producing drawings having the smallest format (A4). The partitions $30_1$, $30_2$ are thus spaced apart from each other by a distance approximately equal to $L_1$. The partitions $30_1$, $30_2$ each leave a limited flow section with the remainder of chamber 24.

Two other partitions $30_3$, $30_4$ that are mutually symmetrical with respect to plane P, delimit compartments $24_2$, $24_3$, with partitions $30_1$, $30_2$ respectively. Partitions $30_3$, $30_4$ are spaced apart from each other by a distance approximately equal to the width $L_2$ of the print medium used for producing A3 format drawings.

Finally, two partitions $30_5$, $30_6$, that are mutually symmetrical with respect to plane P, delimit compartments $24_4$, $24_5$, with partitions $30_3$, $30_4$ respectively, as well as compartments $24_6$, $24_7$, being located at the ends of the chamber. The partitions $30_5$, $30_6$ are spaced apart from each other by a distance substantially equal to the width $L_3$ of the print medium used for producing A2 format drawings The partitions $30_3$, $30_4$, $30_5$ and $30_6$ each leave a limited passage section between the adjacent compartments that they separate.

The suction in chamber 24 is produced by means of a single fan 26 located in the central compartment $24_1$. Other fans may be provided in other compartments, for example inside the end compartments $24_6$, $24_7$.

More generally, the positioning of the partitions in the chamber shall be determined so as to form at least one compartment extending beneath a portion of the platform that comprises at least the fraction of the width of the platform occupied by the print medium used for producing drawings having the smallest format.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A device which maintains contact between a print medium and a guiding platform within a printing zone of a graphics printer which comprises:
    a suction chamber formed beneath said guiding platform of said graphics printer, said guiding platform constituting an upper wall of said suction chamber,
    a plurality of orifices formed across a width of said platform and communicating with said suction chamber,
    at least one suction means provided within said suction chamber for creating a partial vacuum within said suction chamber in combination with said orifices, and
    at least one partition provided within said suction chamber separating said suction chamber width-wise into at least two compartments while providing a limited passage section between adjacent compartments, such that said orifices communicate with each of said compartments, said print medium being guided over said platform covering a variable portion of said width of said platform as a function of a format of said print medium, the first of said at least two compartments extending beneath that portion of said platform which comprises at least a fraction of said width of said platform which would be occupied by said print medium which has the smallest format of those variable formats capable of being accommodated by said printer.

2. The device of claim 1, wherein said suction chamber is provided with a plurality of partitions within said suction chamber at locations substantially corresponding to zones of said platform occupied by longitudinal edges of print media of said variable formats accommodated by said printer, separating said suction chamber into a plurality of compartments, such that said orifices communicate with each of said plurality of compartments.

3. The device of claim 2, wherein passage sections between adjacent compartments have openings which decrease in size in a direction away from said first compartment.

4. The device of claim 1, wherein a suction means is provided in at least said first compartment.

5. The device of claim 1, wherein a suction means is provided within at least two compartments.

6. The device of claim 1, wherein said first compartment is located at an end of said suction chamber.

7. The device of claim 1, wherein at least two partitions are provided within said suction chamber and said first compartment is located at a center of said suction chamber.

8. The device of claim 7, wherein said suction means is provided in said first compartment at the center of said suction chamber.

9. The device of claim 5, wherein said suction means are provided in compartments formed at both extremities of said suction chamber.

10. The device of claim 3, wherein said first compartment is located at one end of said suction chamber.

11. The device of claim 10, wherein said suction means is provided in said first compartment.

12. The device of claim 3, wherein said first compartment is located at a center of said suction chamber.

13. The device of claim 12, wherein said suction means is provided in said first compartment.

14. A graphics printer comprising:
    a platform,
    a means for supplying a print medium to a surface of said platform,
    means for writing on said print medium, and
    a device for maintaining continuous contact between said print medium and said surface of said platform during writing at a printing zone of said printer, said device including a suction chamber located beneath said platform, said platform constituting an upper wall of said suction chamber and having a plurality of orifices formed across a width of said platform, communicating with said suction chamber, at least one suction means within said suction chamber for creating a partial vacuum within said suction chamber and at least one partition being provided within said suction chamber separating said suction chamber width-wise into at least two compartments while providing a limited passage section between adjacent compartments, such that said orifices communicate with each of said compartments, said print medium being guided over said platform covering a variable portion of said width of said platform as a function of a format of said print medium, the first of said at least two compartments extending beneath that portion of said platform that makes up at least a fraction of said width of said platform which supports said print medium of the smallest of formats capable of being accommodated by said printer.

15. The graphics printer of claim 14, wherein said suction chamber of said device for maintaining continuous contact between said print medium and said platform is provided with a plurality of partitions within said suction chamber at locations substantially corresponding to zones of said platform occupied by longitudinal edges of print media of said variable formats accommodated by said printer, separating said suction chamber into a plurality of compartments, such that said orifices communicate with each of said plurality of compartments.

16. The graphics printer of claim 15, wherein passage sections between adjacent compartments have openings which decrease in size in a direction away form said first compartment.

* * * * *

UNITED STATES PATENT AND TRADEMARK OFFICE
CERTIFICATE OF CORRECTION

PATENT NO. : 5,150,131

DATED : September 22, 1992

INVENTOR(S) : Le Jaoudour

It is certified that error appears in the above-identified patent and that said Letters Patent is hereby corrected as shown below:

Column 1, line 45: "respective" should read --irrespective--

Column 2, line 57: "platform" should read --platform.--

Column 3, line 18: "for" should read --from--

Column 3, line 42: "medium" should read --medium.--

Column 3, line 60: --depending on the format of the print medium.-- is to be inserted after "20a,"

Column 4, line 34: "24" should read --24.--

Column 5, line 39: "$30_1$" should read --$30_2$--

Column 5, line 41: "30" should read --$30_1$--

Column 5, line 50: "medium" should read --medium.--

Column 6, line 25: "platform" should read --platform.--

Column 6, line 33: "24" should read --$24_1$--

Column 6, line 54: "drawings" should read --drawings.--

Signed and Sealed this

Twelfth Day of October, 1993

Attest:

BRUCE LEHMAN

*Attesting Officer*   *Commissioner of Patents and Trademarks*